C. EISLER.
SHEET METAL DEVICE.
APPLICATION FILED NOV. 30, 1917.

1,309,616.

Patented July 15, 1919.

INVENTOR
Charles Eisler.
BY Jos. F. Ebert
ATTORNEY

UNITED STATES PATENT OFFICE.

CHARLES EISLER, OF IRVINGTON, NEW JERSEY, ASSIGNOR, BY DIRECT AND MESNE ASSIGNMENTS, OF ONE-THIRD TO GEORGE ZISCH AND ONE-THIRD TO NEWARK ENGINEERING AND REFRIGERATING COMPANY, OF NEWARK, NEW JERSEY, A CORPORATION OF NEW JERSEY.

SHEET-METAL DEVICE.

1,309,616.      Specification of Letters Patent.      Patented July 15, 1919.

Application filed November 30, 1917. Serial No. 204,663.

*To all whom it may concern:*

Be it known that I, CHARLES EISLER, a citizen of the United States, residing at Irvington, in the county of Essex and State of New Jersey, have invented certain new and useful Improvements in Sheet-Metal Devices, of which the following is a full, clear, concise, and exact description.

My invention relates to the production of sheet metal devices and especially to nuts formed from a single piece of metal, said devices being characterized by simplicity of construction, and adapted to function very advantageously in meeting all of the requirements imposed upon them under various service conditions to which they may be subjected.

An object of the invention is the production of a nut made of sheet metal so formed as to be easily and economically manufactured.

Another object is the production of a sheet metal device having a continuous screw thread.

A still further object of the invention is the construction of a nut made of thin sheet metal in which sufficient stock is provided for allowing the cutting of a continuous screw thread, the formation of a portion suitable for affording a grip for the hand or a wrench and protection for the end of the stud or bolt carrying the nut, and another portion adapted to function as a contact surface in the place of a washer.

Figure 2:
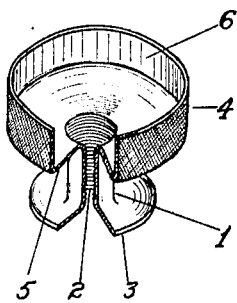
Figure 1:
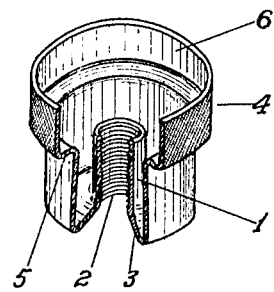
Figure 3:
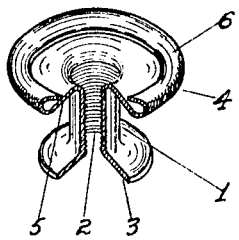
Figure 4:
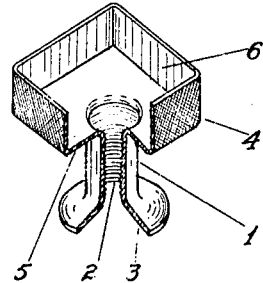

Other objects will manifest themselves upon a reading of the following description taken in connection with the accompanying drawings, in which Figure 1 is a view, partly in section, of a nut embodying my invention, Figs. 2, 3, and 4 illustrates modifications of the nut shown in Fig. 1, and coming within the scope of the invention.

Similar reference characters refer to corresponding parts throughout the several figures.

A device embodying the features of my invention may be composed of a thin piece of sheet metal, which may be easily formed into any desired shape by means of a punch press. The series of operations requisite to produce any of the devices illustrated will be apparent to those skilled in the art, and detailed description is accordingly omitted. Suffice it to say, that, by suitable dies and operations, a nut having the features of those shown, may be formed. The operations start with a blank piece of metal which may first be given a cylindrical shape 1, the material comprising the cylinder being adapted to permit the cutting of a continuous screw thread 2. The next operation may produce a contacting surface 3, which is of sufficient area to function as a washer for a nut. Subsequent operations will result in the formation of a gripping portion 4, which may be produced by first turning over laterally one end of the stock, to provide a shoulder or offset portion 5, which may be succeeded by an upturned gripping surface 6, as shown in Figs. 1-4 inclusive. By providing the upturned portion 6, the threads upon the end of the bolt or stud will be protected in the event the latter protrudes beyond the threaded portion 1. The construction shown in Fig. 1 is especially adapted for accomplishing this function. As shown, this modification of the nut contemplates a structure having an outer and an inner cylindrical portion coaxial with each other, the outer portion terminating in the gripping portion 6 which is also coaxial with and extends a considerable distance above the inner cylindrical portion 1. For convenience, the exterior of the gripping surface 6 may be knurled to assist in the ready tightening or loosening of the devices contemplated.

While this invention has been set forth in certain preferred embodiments it will be understood that modifications might be made without departure from the spirit and scope thereof.

What I claim as my invention is:

An article of manufacture made of sheet metal and having a central portion provided with a continuous screw thread, a gripping portion, and a contacting surface adapted to function as a washer, the said gripping portion being turned upwardly and extending beyond the threaded portion.

In testimony whereof, I have hereunto subscribed my name this 27th day of November 1917.

CHARLES EISLER.